US005151636A

United States Patent [19]

Winebarger

[11] Patent Number: 5,151,636

[45] Date of Patent: Sep. 29, 1992

[54] ROTARY DIE CUTTING APPARATUS AND METHOD WITH DISCONNECT

[76] Inventor: Kennith N. Winebarger, 2007 Woodbriar Loop South, Lakeland, Fla. 33813

[21] Appl. No.: 493,064

[22] Filed: Mar. 12, 1990

[51] Int. Cl.[5] .......... H02P 3/00

[52] U.S. Cl. .......... 318/272; 318/446

[58] Field of Search .......... 318/434, 261, 269, 273, 318/272, 362, 369, 55, 56, 57, 59, 60, 63, 446; 328/803, 815, 930, 909, 903; 101/219, 226, 228, 248, 212, 216, 226, 227, 181, 183; 271/21, 25, 109, 110, 136, 256–259, 262, 263

[56] References Cited

U.S. PATENT DOCUMENTS

| | | | |
|---|---|---|---|
| 4,177,730 | 12/1979 | Schriber et al. | 101/248 |
| 4,512,256 | 4/1985 | Schriber et al. | 101/248 |
| 4,939,992 | 7/1990 | Bird | 101/183 |

*Primary Examiner*—A. Jonathan Wysocki

*Attorney, Agent, or Firm*—Gifford, Groh, Sprinkle, Patmore and Anderson

[57] ABSTRACT

An improved rotary die cutter apparatus where an anvil roller is powered separately from the die roller. The anvil roller and one embodiment of the present invention is completely unpowered or freewheeling as soon as cardboard is fed through the rotary die cutting apparatus, and in another embodiment is driven at a compensating speed either slightly slower at the same speed as or faster than the die cutting roller to eliminate noise pollution and tolerance problems.

42 Claims, 5 Drawing Sheets

ROTARY DIE CUTTING APPARATUS AND METHOD WITH DISCONNECT

BACKGROUND OF THE INVENTION

The present invention relates generally to die cutting apparatus, and more particularily to rotary die cutting apparatus of the type having an anvil roller and a die roller mounted for rotary motion in a parallel spaced relationship which will die cut cardboard traveling on an axis perpendicular to the axis of rotation of said rollers. Previous rotary die cutting apparatus have had the upper die roller and the lower anvil roller geared together by a pair of gears having a unequal number of teeth to provide for slightly different rpm so that the cardboard passing there through would be "grabbed" and pulled through the apparatus. This method of driving the anvil roller in the prior art devices has caused long standing problems in the art.

DESCRIPTION OF THE PRIOR ART

In the prior art rotary die cutting devices, the upper roller, mounted perpendicular to the path of travel of the cardboard through the machine, was generally the die roller and it had suitable steel rule dies mounted thereon for cutting the cardboard which passes between the die roller and the anvil roller. The anvil roller generally had a covering of a soft polyurethane material or "blanket" against which the steel rule dies pressed after passing through the cardboard. The die and anvil roller were joined by large gears having slightly differing number of teeth to provide for differing rpm's of the anvil and die rollers. It was this differing rpm which caused the cardboard to be "pinched" between the rollers and start through the die cutting process. The fact that both rollers were driven continued the cardboard traveling through the die cutting apparatus.

However, even though this provided an expedient way of starting the die cutting process, it produced serious and long standing problems in the prior art.

The first of these problems caused by the unequal rates of rotation of the anvil and die roller was a crushing of the edge of the piece of cardboard when it started the die cutting process because the faster roller tried to pull one side of the cardboard being die cut, while the slower roller tried to brake the other surface of the cardboard, at best only crushing the forward edge of the cardboard to be die cut, and at worst providing a shearing action sufficient to tear the corrugations between the upper and lower surfaces.

Another problem caused by the uneven rotation of the rollers is only today becoming recognized as what may be termed a "noise pollution" problem. Because of the uneven rotation, the steel rule dies were not supposed to hit the blanket in the same place twice. The original thought of this was to save wear on the blanket, but because the dies on the die roller many times are not continuous, and when they are, they do not cover the entire circumference of the die roller, will always be a period of time when there a die approaching the blanket at a faster feed than the blanket is rotating, and a loud "slapping" sound can be heard any place the prior art machines are in operation. This noise is inherent in the construction of such machines, but is eliminated in the present invention.

Another serious problem in the art is maintaining the accuracy of the length of the die cut piece. Since the upper roller and lower rollers were geared together in the prior art devices a very accurate initial setup could be attained. However, as the blanket on the anvil roller wears, due to the slapping and other stresses of operation, the anvil roller will travel at a greater and greater differing speed than the die roller, aggravating the previously mentioned crushing and shearing problem, and causing the length of the blanks to be shorter and shorter as they are pushed through the die cutting apparatus at a faster speed than the rotation of the die roller at any time there is not a steel rule die engaging the cardboard perpendicular to the path of travel to provide a stopping action. Depending on the blank being die cut such action caused the scrapping of a large amount of cardboard and subsequent blanket wear.

SUMMARY OF THE INVENTION

Many attempts have been made to solve the problems in the prior art over a long period of time. It was first thought that simply disconnecting the anvil roller from the die roller and letting the anvil roller freewheel would solve the problems in the art. However, this unexpectedly caused a severe problem in the actual operation of such machine, as while the die roller could easily be stopped because of its geared construction when the die cutting process was completed, the freewheeling anvil roller would continue rotating for a long period of time and was difficult to stop. In some cases it is believed that injuries resulted from the freewheeling anvil roller because of press operators not being familiar with the inertia of the anvil roller attempting to stop the anvil roller by hand in order that the die roller setup could be changed.

The next attempt at solving these problems involved simply attaching a DC drive motor to the anvil roller which was rated at the same rpm as the die roller. However, because, of manufacturing and electrical tolerances it was found that such motor was never exactly able to drive the die roller and the anvil roller at the same rpm, and in many instances the aforementioned problems of shearing and tearing were aggravated instead of improved.

After much experimentation it was determined that a combination of the two earlier attempts would solve the long standing problems in the art, and that by either disconnecting the anvil roller only when cardboard was being fed therethrough or driving the anvil roller at a closely monitered rpm controlled by a feedback circuit to monitor and adjust the length of cut would the problems in the prior art be solved.

Thus, it is an object of the present invention to provide an improved rotary die cutting apparatus which reduces or eliminates the shearing and or crushing problems present in the prior art devices.

It is a further object of the present invention to provide a method of operation of a improved rotary die cutting apparatus wherein blanket life is extended substantially.

It is a further object of the present invention to provide an improved rotary die cutting apparatus wherein the anvil roller is driven separately from the die roller.

It is a still further object of the present invention to provide an improved rotary die cutting apparatus which provides for freewheeling of the anvil roller when cardboard is being fed through the rotary die cutting apparatus.

It is a still further object of the present invention to provide an improved rotary die cutting apparatus which provides for driving the anvil roller at substantially the same speed as the die roller at all times except when cardboard is being fed through said rotary die cutting apparatus.

It is a further object of the present invention to provide an improved rotary die cutting apparatus of the type wherein the anvil roller may either be left to free-wheel when cardboard is being passed through said apparatus, or the motor driving said apparatus may be operated through a feedback circuit and be provided with a compensating voltage to drive the anvil roller slightly slower or slightly faster than the die roller at the compensating speed to adjust the length of die cut made by said rotary die cutting apparatus.

It is a further object of the present invention to provide a rotary die cutting apparatus of the foregoing nature which is provided with a regenerative drive unit for controlling the deceleration rate of the anvil roller to conserve energy.

It is a further object of the present invention to provide a rotary die cutting apparatus of the foregoing nature wherein provisions are made to "jog" the anvil roller to aid in the setup of said die cutting apparatus.

Further objects and advantages of the present invention will be apparent from the following description and appended claims, reference being made to the accompanying drawings forming a part of the specification, wherein in like reference characters designate corresponding parts in the several views.

It is to be understood that the present invention is not limited to the details of construction and arrangement of parts illustrated in the accompanying drawings, since the invention is capable of other embodiments, and of being practiced and carried out in various ways within the scope of the claims. Also, it is to be understood that the parapsychology and terminology employed herein is for the purpose of description, and not of limitation.

DETAILED DESCRIPTION OF THE PREFERRED EMBODIMENTS OF THE PRESENT INVENTION

Figure 1:
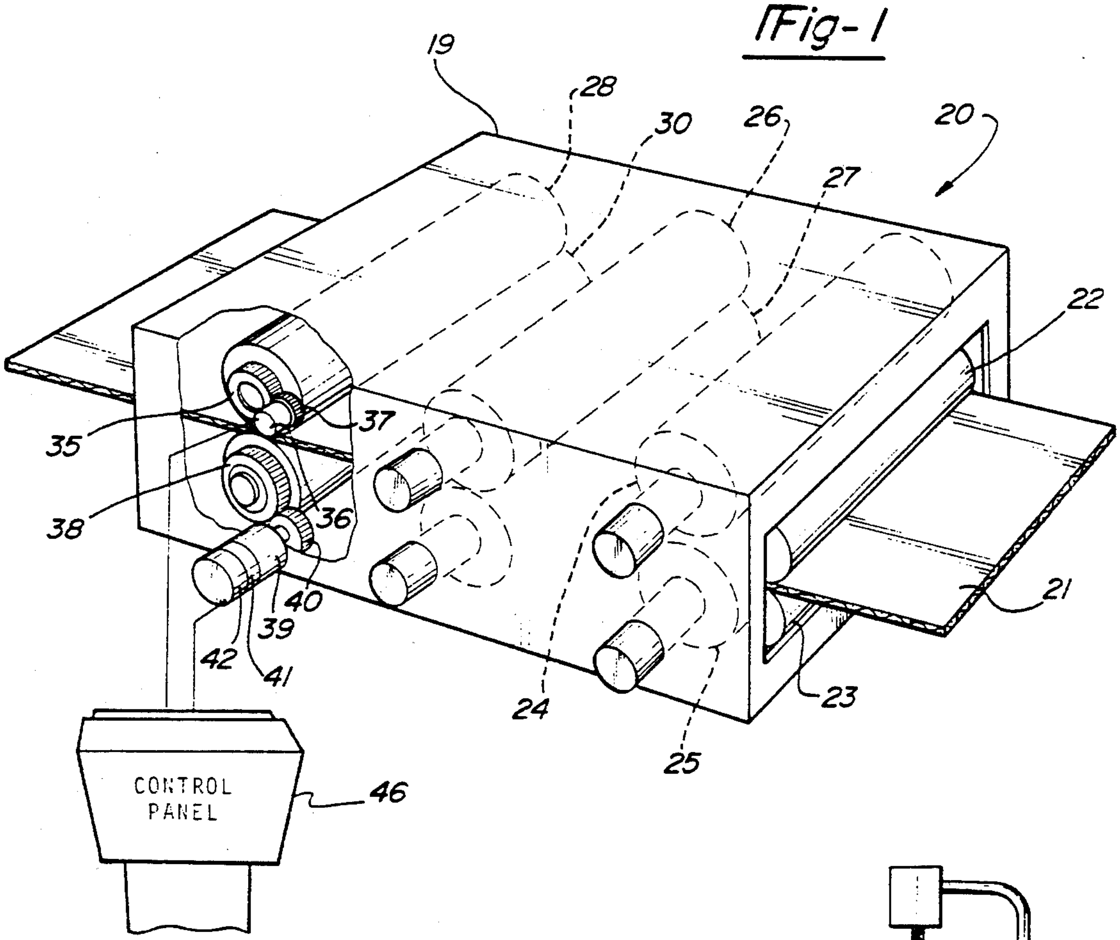
FIG. 1 is a partially cut away perspective view of a construction embodying the present invention.

Referring now to FIG. 1, there is shown a rotary die cutting apparatus embodying the construction of the present invention generally designated by numeral 20. Said apparatus has a frame member 19 which, in the representative rotary die cutting apparatus shown, supports a plurality of pairs of rollers for performing various operations. For example, a sheet of cardboard (21) may be fed between a upper feed roller (22) and a lower feed roller (23) to a pair of printing rollers comprising a first color print roller (24) and a first color support roller (25). As is well known in the art, each color printing will require a separate set of rollers, and in the machine illustrated, the cardboard is next fed through a second color print roller (26) and a second color support roller (27). These various devices may be found in one or more combinations in various prior art machines, and form no part of the present invention.

Figure 2:
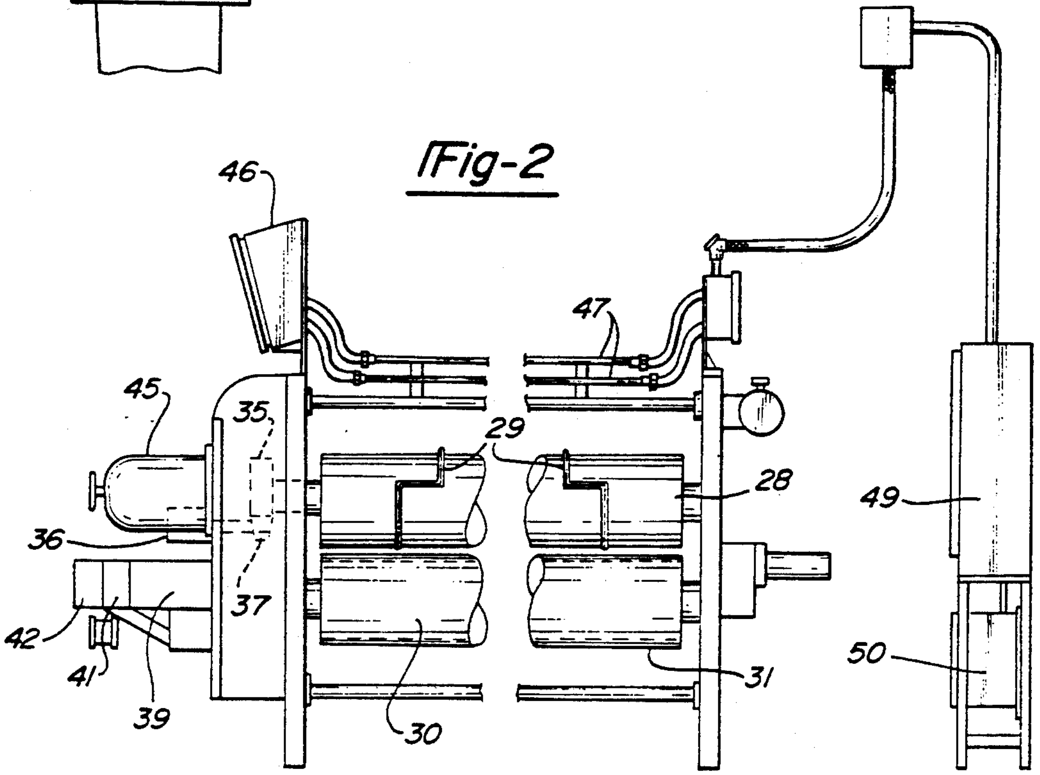
FIG. 2 is an elevational view, partly cut away, showing the invention installed in a rotary die cutting machine.

However, the cardboard (21) eventually comes to the die cutting operation wherein, in a typical rotary die cutting machine as shown in FIG. 2 there will be a die roller (28), so called because of the steel rule dies (29) found thereon, which perform the cutting operation, and an "anvil" or "blanket" roller (30) typically having a "blanket" (31) of shock absorbing material such as polyurethane mounted thereon, into which the steel rule dies (29) will imbed themselves slightly in operation.

In the illustration in FIG. 1, the apparatus is shown with my construction installed as original equipment, and in this case, the anvil and die rollers are not tied together, as they would be in a pre-existing construction on which my invention is mounted. Instead, the die roller (28) is driven by means well known in the art (not shown) and has a die roller gear (35) operating a tachometer generator (36) through a first small gear (37).

The anvil roller (30) has an anvil roller gear (38) connected to a DC motor (39) by a second small gear (40).

Mounted to the DC motor are a clutch (41) and a brake (42).

Figure 3:
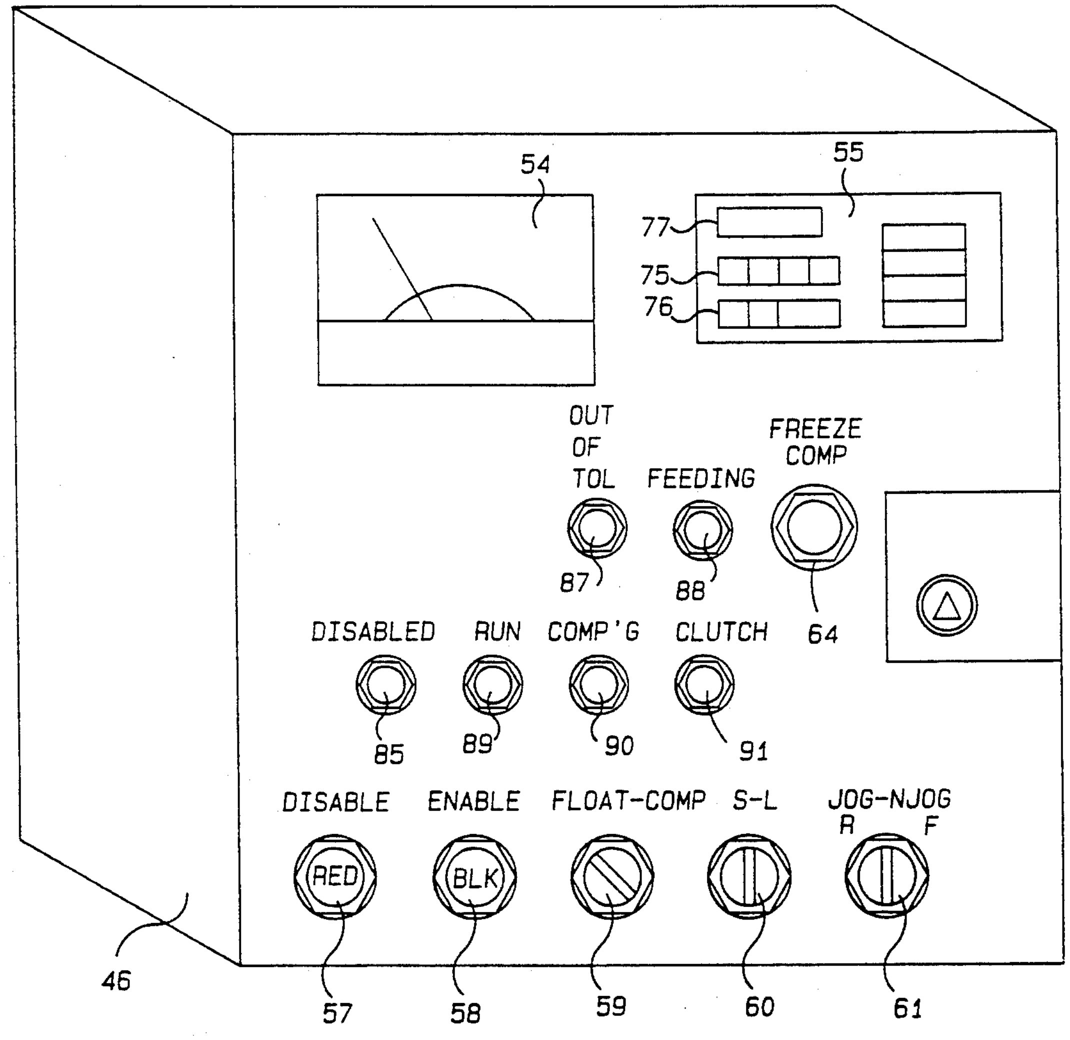
FIG. 3 is a perspective view of the control panel shown in FIG. 2.

Referring now to FIGS. 2 and 3, there are illustrated additional controls which are needed for my invention over those found in the existing constructions. Although most of these controls would be found in the embodiment illustrated in FIG. 1, for ease of understanding, FIG. 2 and subsequent figures will be described as if the invention was installed as a conversion of an existing machine.

Figure 4:
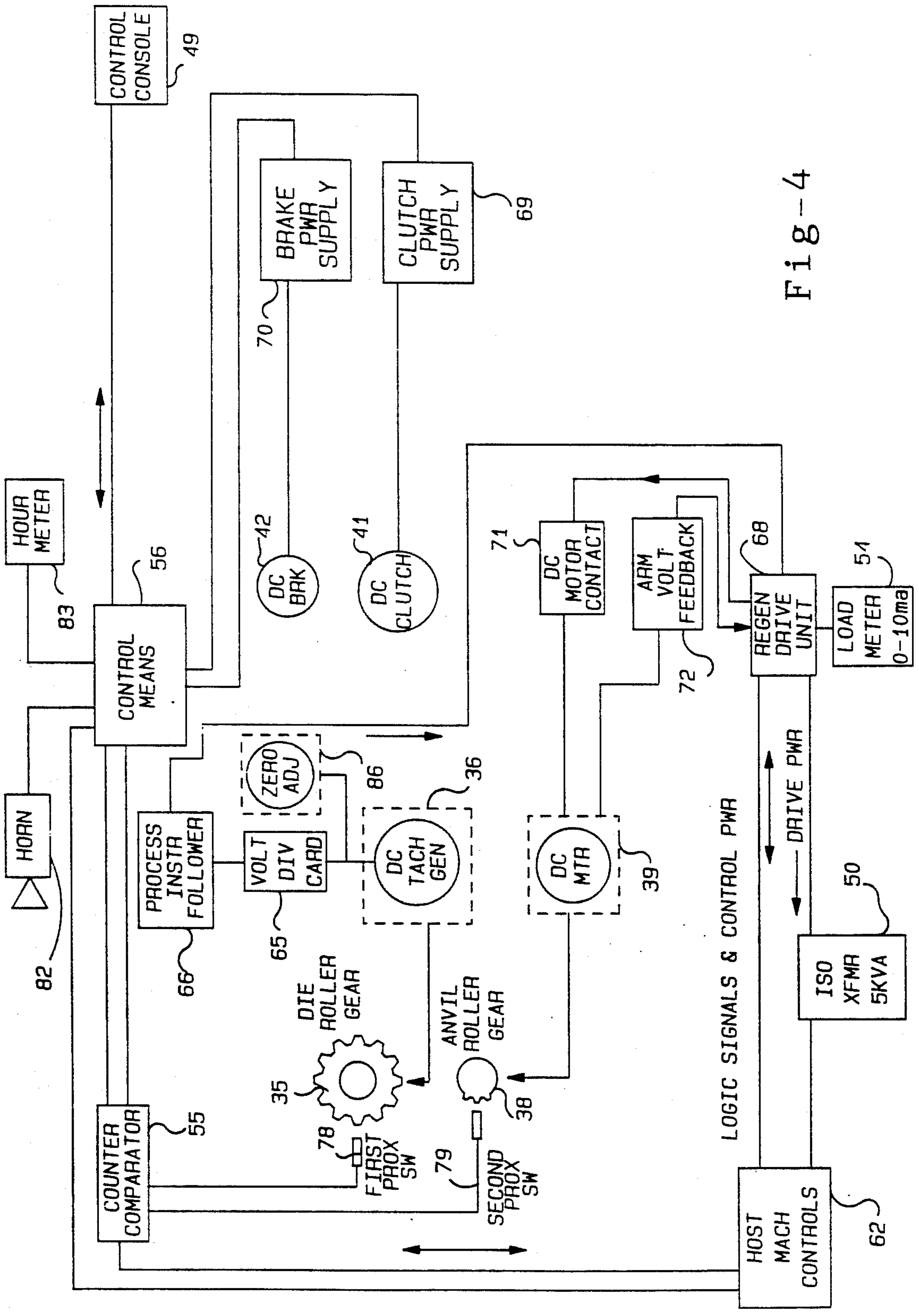
FIG. 4 is a diagrammatic view showing the present invention.

Referring now to FIG. 4, a diagrammatic view of a typical installation is shown. On the host machine in which my invention is installed, there will be host machine controls (62) to provide for operation of the other apparatus found in the machine such as the feed rollers, printing rollers, etc. The control panel (46) previously mentioned will be connected to the control means (56). The DC tachometer generator (36) is provided for the purpose of determining the speed of the die roller, since the object of the present invention is to either let the anvil roller freewheel when cardboard is being fed through the rollers, or to drive the anvil roller (30) at a compensating speed either slightly greater, the same as, or slightly slower than the speed of die roller (28).

In order to do this, a reliable indication of the speed of the die roller is needed. This is provided by the tachometer generator (36) being driven by the die roller gear (35). The signal from the DC tachometer generator is first provided to a voltage divider (65) where it is reduced to a signal useable by the rest of the system, and then said signal is supplied to the process instruction follower card (66) where it is optically isolated before being supplied to the regenerative drive unit (68). The voltage divider 65 may be such as the Model SP-102931 produced by the Allen Bradley Company of the Milwaukee, Wis., while the process instruction follower 66 may be such as the Model 1370-PF, also produced by Allen Bradley. The regenerative drive unit 68 may be such as the part number 1318-BOA020 20 amp 230 volts AC regenerative drive produced by Allen Bradley of Milwaukee, Wis.

Having now provided for an accurate signal indicative of the speed of the die roller (28) it is now necessary to provide a means to control the speed of the anvil roller gear, or simply disconnect the same when desired. In one embodiment of my invention wherein it is simply desired to let the anvil roller (30) freewheel as soon as cardboard is fed through the die roller (28), the DC clutch (41) is provided, which simply disengages the DC motor (39) when an appropriate signal, host run signal is received from the host machine controls (62) indicating that cardboard is being fed to the die roller. It should be understood that in all of the illustrated embodiments, DC motors are being used to perform the task of driving the anvil roller, but it is well within the scope of the present invention that appropriate circuitry be provided so that the same functions could be performed by AC motors and circuitry.

A clutch power supply (69) is provided to supply power to the DC clutch (41), and the signal for its operation comes from the control means (56).

In the embodiment where it is desired to supply a compensating signal to the DC motor, to drive it at a compensating speed, a feedback loop consisting of the regenerative drive unit (68), the DC motor contactor (71), and the armature voltage feedback (72) are provided. The regenerative drive unit (68) initially supplies a signal to the DC motor contacter (71), which may be such as part number 1370-NC56 produced by the Allen Bradley Company of Milwaukee, Wis., which is indicative of the speed that it is desired to drive the DC motor (39) at. A signal from the DC motor contactor (71), is then provided to the DC motor (39) which is driving the anvil roller (30) through the anvil roller gear (38) and the second small gear (40). The armature voltage feedback card (72), which may be such as part number 1370-NC56 produced by the Allen Bradley Company, receives a signal from the DC motor (39) indicative of the speed it is being driven at by the DC motor contactor (71). It is converted to a signal and supplied to the regenerative drive unit (68) which makes the necessary adjustments.

To provide useful information to the operator the control panel 46 has a plurality of displays as shown in FIG. 3. Mounted to the counter comparater (55) is a first display (75) indicating the speed of the die roller (28), and a second display (76) indicating the speed of the anvil roller, while the ratio display (77) displays the ratio of the speed of the die roller (28) to the anvil roller (30). To provide the necessary information to these displays, a first proximity switch (78) is placed proximate die roller gear (35) to provide the counter comparator (55) with a signal indicative of the speed of said die roller. A second proximity switch (79) is placed proximate the anvil roller gear (38) to provide a signal indicative of the speed of the anvil roller, and the necessary circuitry found in the counter comparator (55), which may be a counter comparator such as the Model 797506-20 produced by Veeder-Root of Hartford, Conn. Counter comparator (55) calculates the necessary ratio for the ratio display (77). The regenerative drive unit (68) provides the necessary signal to the load meter (54) to indicate its condition to the operator, while a horn (82), and an hour meter (83) may optionally be provided and connected to the control means to provide useful information to the operator. An isolation transformer 50 is connected between the host machine control 62 and the regenerative drive unit 68.

Figure 5A:
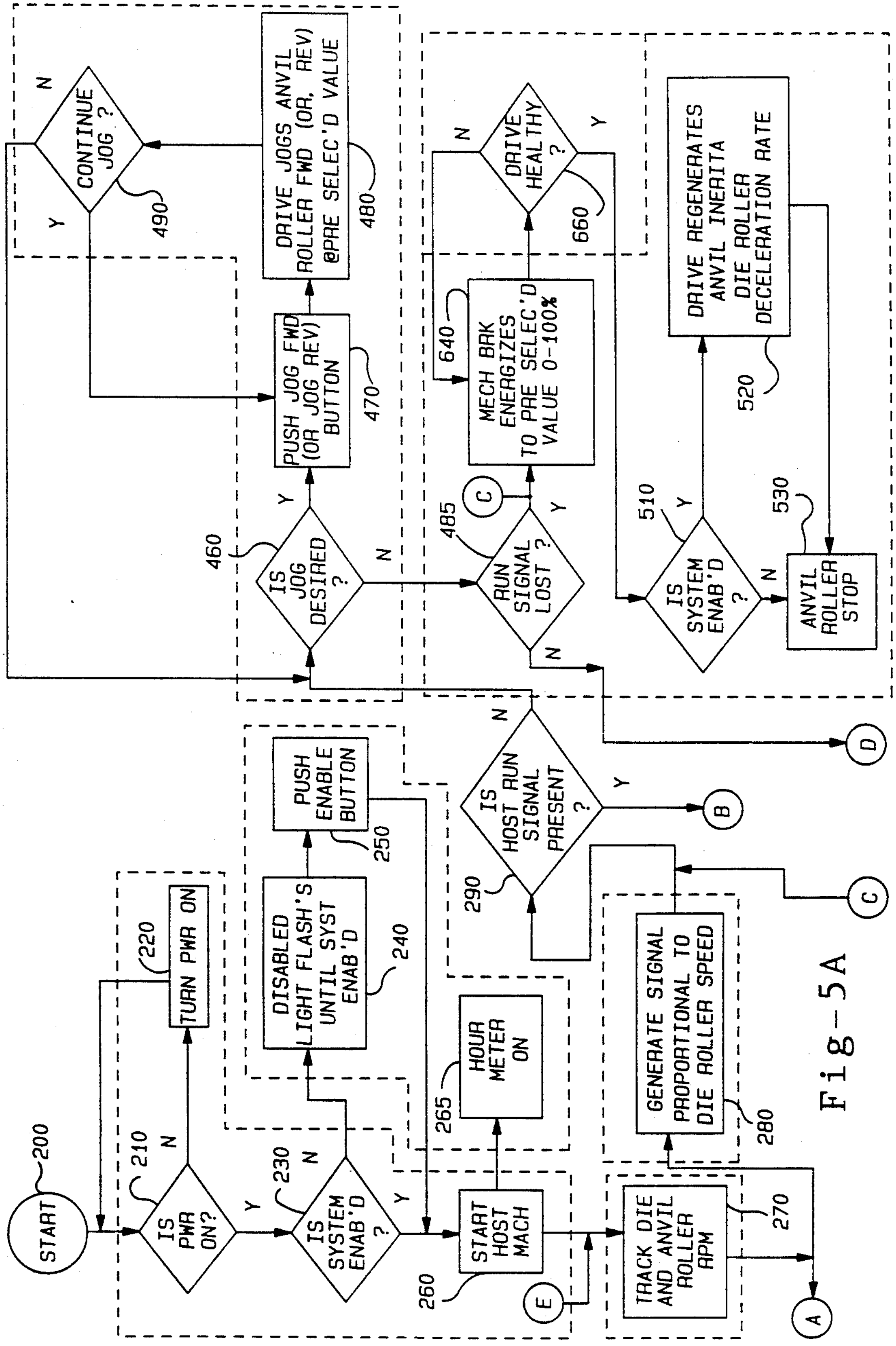
FIGS. 5(*a*) and 5(*b*) show a flow diagram illustrating the steps used in the method of the present invention.
Figure 5B:
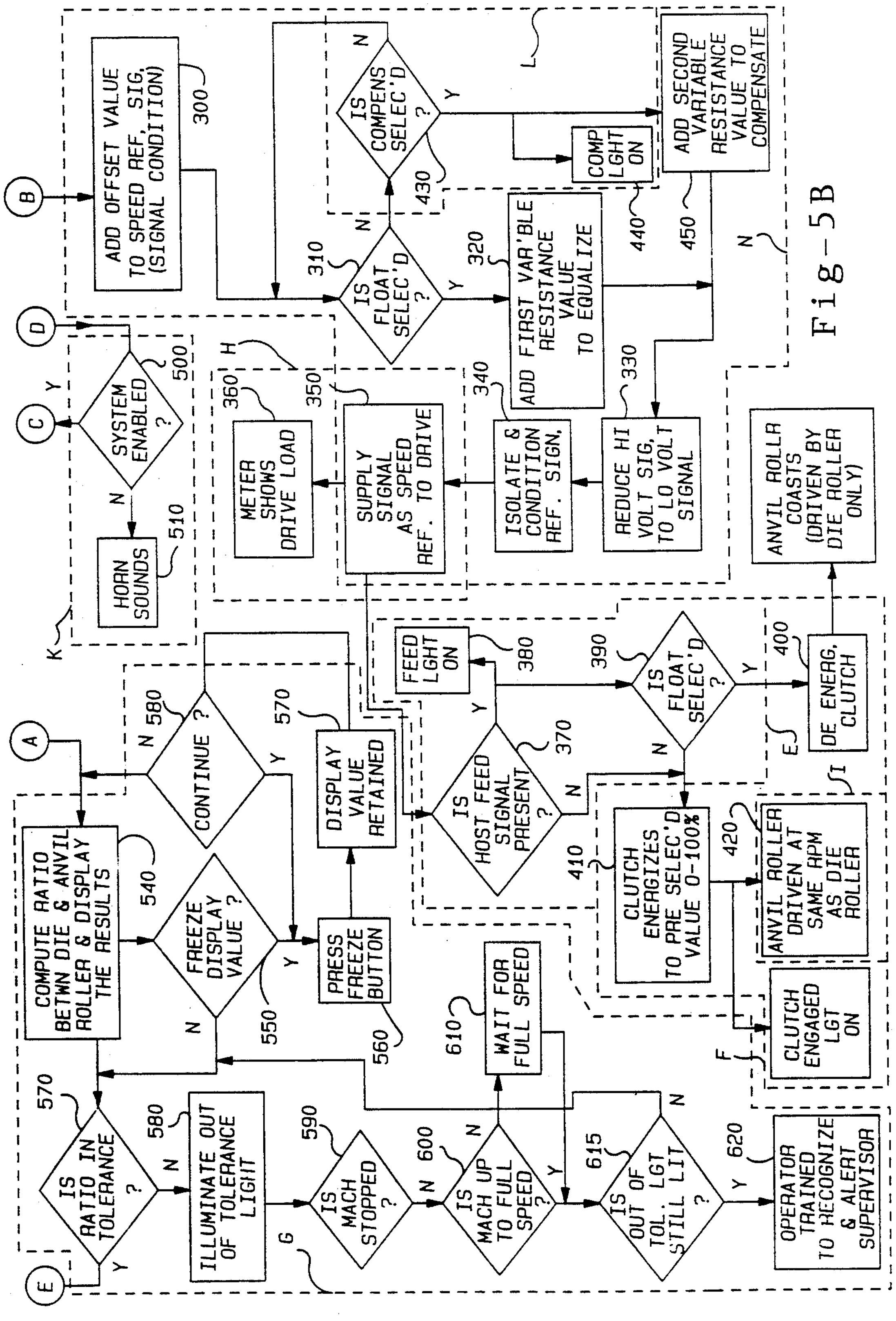

Refering now to FIGS. 5(*a*) and 5(*b*), the method of operation of the invention can be observed. When it is desired to operate the improved rotary die cutting apparatus, the start push button (Box 200) will be depressed, and this will cause the system to inquire (Box 210) if the power is on. If the power is not on, the power will be turned on (Box 220), and the system will return to (Box 210) and, this time, will determine the power is on and the question next asked will be: Is the system enabled (Box 230)? If the system is not enabled, the disenabled signal light is caused to flash (Box 240) until the operator pushes the enable button (58) as indicated by (Box 250).

The system will then indicate (Box 260) that the system should be started and turn the hour meter on (Box 265). The starting of the system will be provided by a signal sent from the auxiliary control console (49) to the host machine controls (62). Next, the system will track the die and anvil roller rpm (Box 270) and generate a signal porportional to the die roller speed (Box 280) in the manner previously described using the DC tachometer generator (36), the voltage divider card (65), the process instruction follower (66), and the regenerative drive unit (68). It is to be noted that a zero adjust (86) is provided for the DC tachometer generator as shown in FIG. 4.

If the host run signal is present (Box 290) the signal will be conditioned (300), and the system will then ask: Is float selected? Float block (310) is the condition when the anvil roller is to freewheel as soon as it is determined that cardboard is being supplied to the anvil roller (30). If float is selected, the system will add a first variable resistance (320) to first equalize the speed of the anvil roller (30) and the die roller (28). It will condition the signal (Box 330) by the use of the voltage divider card (66), and will isolate (Box 340) the signal by the use of the process instrument follower (66), and then supply the signal to the regenerative drive unit (350), supplying a signal (360) to the load meter (56). If the host feed signal remains present, (Box 370), the feed light (87) (88) is turned on (Box 380), and the system again checks (Box 390) that float is selected. If float is selected, the clutch (41) is de-energized (Box 400), and the anvil roller simply floats as long as the host feed signal is present (Box 405). If the host feed signal is not present (Box 370), the clutch (41) energizes to a preselected value (Box 410), and the anvil roller (30) is driven at the same speed as the die roller (28) (Box 420) and the clutch engaged light (91) is turned on (Box 425) while cardboard is passing through.

If the question is asked: Is float selected? (Box 310), and the answer is no, the system then asks (Box 430): Is compensate selected? Presuming that compensate is selected, the compensate light (90) is then turned on (Box 440), and a second variable resistance is added to the speed reference signal (Box 450) before the signal is conditioned (Box 330), isolated (Box 340), and supplied to the regenerative drive unit (Box 350). It is important to understand that the second variable resistance is what allows one to drive the anvil roller (30) either slightly faster or slightly slower than the die roller to compensate for the size discrepency of the blanket (31), and therefore maintain the accuracy of the length of cut of the cardboard (21) as it is being fed through the rollers, and at the same time minimize the shearing and tearing problems present in prior art devices.

For the convenience of the operator, there is built into the system a means to aid in the setup of the rotary die cutting apparatus, and this is done by providing means to jog the anvil roller (30) either slowly forward or in reverse, when desired for setup purposes. This is accomplished by having the system, at the time that it asks if the host run signal is present (Box 290), find that the host run signals is not present. The system then asks (Box 460) if the jog is desired, and if a jog is desired, the operator pushes the jog forward or jog reverse button (61) the drive jogs the anvil roller forward or reverse for a preselected value (Box 480). The system (Box 490) will then ask the system operator if the jog is to continue or not. If the jog is to continue, the operator must push the jog button (61) again and if the jog is not to continue, the system returns itself to (Box 460).

If the jog is no longer desired (Box 460) and the run signal has been lost (Box 485), but the system is still enabled (Box 510), the regenerative drive unit (68) will act as a brake and brake the die roller to a stop (Box 520) and (Box 530).

It should be understood that the use of a regenerative drive unit in a rotary die cutting apparatus is novel. The regenerative drive unit, when it is supplying a signal to the motor, could be described as being connected "like a motor", although to those skilled the art this type of description would be known to be electronically incorrect. However, it would be descriptively correct, and when it is desired to slow down the anvil roller the regenerative drive unit could then be said to be connected "like a generator" and absorb power from the system, which it then feeds back into the AC power line, thus recapturing power that was previously used in driving the DC motor. More complete information on the regenerative drive unit is available from the manufacturer, Allen Bradley of Milwaukee, Wis., and therefore, no further details or description is believed is necessary herein.

Many safety features are built into the present system for the safety of the operator, so that if there is a failure, the anvil roller (30) will be braked to a stop, and continue to run when the die roller (28) stops. For example, any time the run signal is lost, and the host run signal is not present (Box 290) the system will check to see if the system is still enabled (Box 510), and then the regenerative drive unit will generate a deceleration rate (Box 520) to cause the anvil roller to come to a stop.

It is anticipated that in some applications, the regenerative drive unit (68) will not have sufficient braking power to slow down the die roller (28) the desired amount, whether this a normal slowing process, when the anvil roller is being driven at a compensating speed, or a situation wherein the anvil roller must be stopped quickly. In either instance, the brake (41) will energize to a predetermined extent (Box 640) to aid the regenerative drive means (68) then inquire (Box 650) if the drive is healthy.

Also, at the point where the system asks if the host run signal is present (Box 290) and the host run signal is present, a jog is not desired (Box 460), and the run signal is not lost (Box 485), and the system is not enabled (Box 500), which is equivilent to a total shutdown of the system for whatever reason, the horn (82) sounds (Box 505) to alert the operator.

If the host run signal is not present (Box 290), a jog is not desired (Box 460), the run signal is lost (Box 485), but the system is enabled the system will again ask is the host run signal present (Box 290), and repeat the series of steps just described until a host run signal is present, at which time the system will return to normal operation.

As previously described, as an option to give valuable information to the operator of the system, a counter comparator (55) is provided to display the speed of the die roller (28), the speed of the anvil roller (30), and a ratio between the said two speeds. This is accomplished by the system simultaneously with controlling the speed of the anvil roller. As the system tracks the die and anvil roller rpm (Box 270), it also generates a signal proportional to the die roller speed (Box 280), computes a ratio between the die and anvil roller, and displaying the results (Box 540). The system next inquires if it should freeze the display value (Box 550), and if it is desired to freeze the display value the operator will push the freeze push button (64) (Box 560). The purpose of the freezing is to view the rapidly changing display values. If it is not desired to freeze the display value, the system will inquire as to whether the ratio is within the predetermined selected tolerance (Box 570). If the ratio is in tolerance, the system will just continue to track the die and anvil roller rpm (Box 270), compute the ratio between the die and anvil roller, and display the results (Box 540), and again inquire as to whether the display value should be frozen (Box 550) and repetitively inquire if the ratio is in tolerance, and will continue this sequence of operation until it is determined that the ratio is out of tolerance. When the freeze button is depressed (Box 560), the system retains the display value (Box 575), and inquires whether it should continue (Box 585).

Once the ratio is determined to be out of tolerance (Box 570) the system will illuminate the out of tolerance light (87) (Box 580), and inquire as to whether or not the machine is stopped (Box 590). If the machine is not stopped, the system asks (Box 600): Is the machine is up to full speed? If the machine is not up to full speed, the system will wait (Box 610) a predetermined interval to determine if the machine is up to full speed. And whether or not the machine is up to full speed, the system will alert the operator (Box 620) who will in turn alert his supervisor to the condition of the system.

Thus, by carefully analyzing the problems present in the prior art, and conducting the necessary experimentation over a period of time, the problems of crushing and shearing present in the prior art, as well as the noise pollution and tolerance problems have been largely eliminated, and a more accurate and more efficient rotary die cutting apparatus has been provided.

I claim:

1. A rotary die cutting apparatus of the type having a power driven die roller mounted for rotary motion perpendicular to an axis of travel, and an anvil roller mounted for rotary motion in a spaced parallel relationship to said die roller, said rotary die cutting apparatus having a controller generating a feed signal in response to cardboard being fed into said rotary die cutting apparatus, the improvement comprising:

a) means for driving said anvil roller at a speed substantially the same speed as said die roller, b) means for mechanically disconnecting said anvil roller from said means for driving, and c) means for controlling said means for driving and said means for disconnecting in response to said controller generating said feed signal to prevent the shearing and crushing of said cardboard.

2. The device defined in claim 1, wherein said means for driving said anvil roller is:

a DC drive motor.

3. The device defined in claim 2, wherein said means for disconnecting said anvil roller include:

a) a clutch interposed between said DC drive motor and said anvil roller, and b) a brake connected to said DC motor, said clutch and said brake being connected to said means for controlling.

4. The device defined in claim 3, wherein said means for driving said anvil roller further includes:

a) means for sensing the speed of said die roller to provide a die roller speed signal representative thereof, b) means for conditioning said die roller speed signal to limit its maximum value, and c) means for supplying electrical power to said motor in proportion to said die roller speed signal to rotate said anvil roller at the same speed as said die roller.

5. The device defined in claim 4, and further including:

a) means for providing a feedback to compare the actual speed of said DC drive motor with the speed of said die roller and for supplying a correction signal to said means for supplying electrical power to said motor.

6. The device defined in claim 5, wherein said means for supplying electrical power is a regenerative drive.

7. The device defined in claim 6, wherein:

a) a brake power supply is connected between said brake and said means for controlling.

8. The device defined in claim 7, wherein:

a) a clutch power supply is connected between said clutch and to said for controlling means.

9. The device defined in claim 8, and further including:

a) means for comparing the speed of said die roller with the speed of said anvil roller and for displaying the results.

10. The device as defined in claim 9, wherein:

a) said means for sensing the speed of said die roller includes a Dc tachometer generator.

11. The device defined in claim 10, wherein the means for conditioning said signal includes:

a) a voltage divider.

12. The device defined in claim 11 further including means for removing electrical noise disposed between said voltage divider and said regenerative drive.

13. The device as claimed in claim 12 wherein said means for providing a feedback includes means for providing a feedback as an armature voltage of said motor.

14. The device defined in claim 13, and further including:

a) a horn connected to said means for controlling and, b) an hour meter connected to said means for controlling.

15. The device defined in claim 14, wherein said regenerative drive and said means for controlling receive signals from said controller.

16. A rotary die cutting apparatus of the type having a power driven die roller mounted for rotary cutting motion on an axis perpendicular to a path of travel, and an anvil roller mounted for rotary motion in a spaced parallel relationship to said die roller to die cut cardboard traveling along said path of travel, and a controller generating a feed signal in response to cardboard being inserted in the die cutting apparatus, the improvement comprising:

a) means for driving said anvil roller to substantially the same speed as said die roller, b) a means for compensating the speed of said anvil roller at a preselected compensating speed slightly greater or slightly less than the speed of said die cutting roller in response to said feed signal being generated by said controller; and c) means for controlling said means for driving said anvil roller and said means for compensating the speed of said anvil roller to prevent the shearing and crushing of said cardboard between said die roller and said anvil roller.

17. The device defined in claim 16, wherein said means for driving said anvil roller includes:

a) a DC drive motor connected to said anvil roller, said means for controlling regulating the rotational speed of said DC drive motor.

18. The device defined in claim 17, further including:

a) a clutch interposed between said DC drive motor and said anvil roller for disconnecting said anvil roller from said DC motor, and b) a brake connected to said DC drive motor said brake stopping said DC drive motor and said clutch enabling engagement and disengagement between said DC drive motor and said anvil roller.

19. The device defined in claim 18, wherein said means for driving said anvil roller further includes:

a) means for sensing the speed of said die roller and for providing a die roller speed signal representative thereof, b) means to condition for conditioning said die roller speed signal to have a predetermined maximum value c) means for supplying electrical power to said drive motor in proportion to said die roller speed signal.

20. The device defined in claim 19, and further including:

a) means for providing feedback to compare the actual speed of said DC motor with a desired speed and for supplying a correction signal means for supply electrical power.

21. The device defined in claim 16, wherein:

a) a brake power supply is connected between said brake and to said means for controlling.

22. The device defined in claim 21, wherein:

a) a clutch power supply is connected between said clutch and said means for controlling.

23. The device defined in claim 22, and including:

a) means for comparing the speed of said die roller to the speed of said anvil roller and displaying the results.

24. The device defined in claim 23, wherein a said means for sensing the speed of said die roller includes a DC tachometer generator.

25. The device defined in claim 24, wherein said means for translating said signal includes:

a) a voltage divider.

26. The device defined in claim 25, further including means for removing electrical noise is disposed between said voltage divider and said regenerative drive.

27. The device defined in claim 26, wherein said means for providing a feedback includes means for providing a feedback of an armature voltage of said motor.

28. The device defined in claim 27, and further including:

a) a horn connected to said means for controlling, and b) an hour meter connected to said means for controlling.

29. The device defined in claim 28, wherein said means for controlling and said regenerative drive unit receives signals from said controller.

30. A method of rotary die cutting of cardboard including the steps of:

a) driving a die roller mounted for rotary motion on an axis perpendicular to a path of travel of said cardboard at a predetermined speed,
b) separately driving a anvil roller mounted for rotary motion in a space parallel relationship to said die roller with a DC drive motor,
c) moving sheets of cardboard along said path of travel and between said rotating die roller and anvil roller for die cutting the same,
d) controlling the speed of said anvil roller at substantially the same speed as said die roller when said cardboard is not being fed through said rotary die cutting apparatus along said path of travel, and
e) disconnecting said anvil roller from said drive motor when said cardboard is being fed between said die and anvil rollers along said path of travel.

31. A method of operating a rotary die cutting apparatus of the type having a power driven die roller mounted for rotary motion on an axis perpendicular to a path of travel, and a separately mounted anvil roller mounted for rotary motion in a spaced parallel relationship to said anvil roller, whereby cardboard traveling along the path of travel is diecut when it passes through the rotating anvil and die rollers, the method including the steps of:

a) determining if the power to said apparatus is on, and is said power is on,
b) determining if said system is enabled, and if said system isn't enabled,
c) starting the host machine,
d) tracking the die and anvil roller RPM,
e) generating a signal proportional to the difference in speed between said anvil roller and said die roller, and
f) determining if said host run signal is present.

32. The method defined in claim 31, and including the further steps of:

a) conditioning said speed reference signal if said host run signal is present, and
b) determining if float is selected.

33. The method defined in claim 32, and including the additional steps of:

a) adding a first variable resistance value to said speed reference signal
b) reducing said speed reference signal to a value useable in said system,
c) isolating said speed reference signal to said anvil roller drive, and
d) determining if said host feed signal is present
e) again determining if float is selected and if float is selected, energizing said clutch.

34. The method defined in claim 33, and including the additional steps of:

a) determining that float is not selected
b) energizing said clutch to a preselected value to drive the anvil roller at the same speed as the die roller
c) turning on a clutch engaged light.

35. The method defined in claim 31, and including the step of:

a) determining said host run signal is not present,
b) determining if a jog is desired, and if a jog is desired jogging said anvil roller forward or in reverse for a number of jogs.

36. The method defined in claim 35, and including the steps of:

a) determining if a jog is desired, and if said jog is not desired, determining if said run signal is lost, and if said run signal is lost energizing said brake.

37. The method defined in claim 32, and including the step of:

a) determining that float is not selected, and determining that compensate is selected
b) adding a second predetermined variable resistance to said speed reference signal
c) conditioning said signal to a signal useable in the system
d) isolating said signal
e) supplying said signal as a speed reference signal to said anvil roller drive
f) determining if said host feed signal is present, and if said host feed signal is present determining if float is selected and if float is selected de-energizing said clutch and letting said anvil roller coast to a stop.

38. The method defined in claim 37, and including the step of determining that:

a) float is not selected, and
b) energizing said clutch and driving said anvil roller at the same rpm as said die roller.

39. The method defined in claim 36, and including the additional steps of:

a) determining that said run signal is not lost, and
b) determining if said system is enabled, and if said system is not enabled, sounding a warning horn.

40. The method defined in claim 33, and including the additional steps of:

a) simultaneously determining if said the ratio of the speeds of said die roller and said anvil roller are in tolerance, and if said ratio is in tolerance compute and display the results.

41. The method defined in claim 50, and including the steps of:

a) determining that said ratio is out of tolerance
b) illuminating an out of tolerance light, and
c) determining if said machine is stopped.

42. The method defined in claim 31, and including the steps of:

a) determining the system as not enabled,
b) flashing a disabled light until the system is enabled
c) pushing the enable button
d) starting the host machine
e) tracking the die and anvil roller rpm
f) generating a signal porportional to the die roller speed
g) determining if a host run signal is present.

* * * * *